US008370737B2

(12) United States Patent
Zahavi et al.

(10) Patent No.: US 8,370,737 B2
(45) Date of Patent: Feb. 5, 2013

(54) METHOD AND SYSTEM FOR INSERTING DATA IN A WEB PAGE THAT IS TRANSMITTED TO A HANDHELD DEVICE

(75) Inventors: Yoram Zahavi, Zichron-Ya'acov (IL); Yoav Weiss, Quartier Grangeneuve (FR); Adi Belan, Tel Aviv (IL); Evgeny Gorokhovsky, Netania (IL)

(73) Assignee: Flash Networks, Ltd, Herzliya (IL)

( * ) Notice: Subject to any disclaimer, the term of this patent is extended or adjusted under 35 U.S.C. 154(b) by 433 days.

(21) Appl. No.: 12/640,084

(22) Filed: Dec. 17, 2009

(65) Prior Publication Data

US 2010/0169763 A1   Jul. 1, 2010

Related U.S. Application Data

(60) Provisional application No. 61/140,932, filed on Dec. 27, 2008.

(51) Int. Cl.
*G06F 17/30* (2006.01)
(52) U.S. Cl. ......... 715/238; 715/234; 715/236; 715/239
(58) Field of Classification Search .................. 715/200, 715/234, 236, 238, 239
See application file for complete search history.

(56) References Cited

U.S. PATENT DOCUMENTS

| 7,031,964 | B1 * | 4/2006 | King et al. ............................ 1/1 |
| 7,823,055 | B2 * | 10/2010 | Sull et al. ....................... 715/201 |
| 2002/0103933 | A1 * | 8/2002 | Garon et al. .................... 709/246 |
| 2002/0156832 | A1 * | 10/2002 | Duri et al. ....................... 709/203 |
| 2004/0201603 | A1 | 10/2004 | Kalish |
| 2004/0202132 | A1 * | 10/2004 | Heinonen et al. .............. 370/331 |
| 2005/0210145 | A1 * | 9/2005 | Kim et al. ....................... 709/231 |
| 2007/0094351 | A1 | 4/2007 | Kalish et al. |
| 2007/0198716 | A1 | 8/2007 | Knowles et al. |
| 2008/0311934 | A1 * | 12/2008 | Soderstrom .................... 455/466 |
| 2009/0144159 | A1 * | 6/2009 | Bashyam ......................... 705/14 |
| 2009/0197597 | A1 * | 8/2009 | Kotecha ......................... 455/433 |
| 2009/0222438 | A1 * | 9/2009 | Strandell et al. .................. 707/5 |

FOREIGN PATENT DOCUMENTS

WO   WO2008073207 A2   6/2008

* cited by examiner

*Primary Examiner* — Stephen Hong
*Assistant Examiner* — Gregory J Vaughn
(74) *Attorney, Agent, or Firm* — Smith Risley Tempel Santos LLC; Gregory Scott Smith; Matthew T. Hoots

(57) ABSTRACT

Disclosed is a system and method that adds additional data (a banner, footer or a header, for example) to a web page while the data is transferred toward a mobile device. An exemplary system can comprise an intermediate node between a surfer and the Internet. Such an intermediate node element can reside at a service provider premises (SPP), for example. The service provider can be a telecom operator, such as but not limited to, a cellular service provider, a satellite communication service provider, a Public Switched Telephone Network (PSTN) operator, an access network service provider, etc. Alternatively, other exemplary embodiments can comprise elements which reside at an Internet Service Provider (ISP) premises.

20 Claims, 6 Drawing Sheets

METHOD AND SYSTEM FOR INSERTING DATA IN A WEB PAGE THAT IS TRANSMITTED TO A HANDHELD DEVICE

CROSS-REFERENCE TO RELATED APPLICATIONS

This application is being filed in the United States Patent and Trademark Office as a non-provisional application for utility patent and claims the benefit of the filing date of the U.S. provisional application for patent that was filed on Dec. 27, 2008 and assigned Ser. No. 61/140,932.

TECHNICAL FIELD

The present invention relates to the field of data communication and, more particularly, to a system and method for adding data to a web page that is transferred to a mobile device.

BACKGROUND

The Internet is an exceedingly popular medium for data communication between computers. The Internet is a hierarchy of many computer networks, all of which are interconnected by various types of server computers. Some of the servers, interconnected through the Internet, also provide database housing or storage for a plurality of web pages. These web pages may be retrieved by users (also referred to as surfers) operating computers that are connected to the Internet and running browser applications. Exemplary browser applications, such as but not limited to, include: Openwave Systems Inc. or Opera Mobile Browser (a trademark of Opera Software ASA), Microsoft Internet Explorer Mobile (a trademark of Microsoft), Firefox Web Browser, etc.

Many current web pages are defined by markup language (ML) files, such as but not limited to HTML, XML, WML, SGML, HDML etc. HTML is an acronym for Hyper Text Markup Language, XML is an acronym for Extensible Markup Language and WML is an acronym for Wireless Markup Language. SGML is an acronym for Standardized General Markup Language. HDML is an acronym for Handheld Device Markup Language. It should be noted that the terms "HTML", "XML", "SGML", "HDML" and "WML" may be used interchangeably herein. Henceforth, the description of different embodiments of the present invention may use the term 'HTML' as a representative term for any of the various forms of markup languages unless specifically limited to a particular markup language.

An ML file contains various commands, instructions, data, and references (links) that together define the overall appearance of a web page once it is fetched and rendered using a browser or other similar application. Common HTML files may comprise information that is relevant to the web page and that is needed for rendering the requested web page. Information such as but not limited to a style sheet, text, images, JavaScript, links to a style sheet, links to JavaScript, links to additional objects, links to other web pages, etc. A web page can be composed from a plurality of objects or segments of the web page that together comprises the web page.

Usually, an HTML file comprises links to the above-described objects rather than comprising the objects themselves. This technique is widely implemented, thus most HTML files can include basic text and links to style sheets, JavaScripts, images, and other objects and not the style sheet or the object itself, etc. Objects that are used by the browser itself are referred as browser's objects. The links to the browser's objects are fetched automatically by the browser during parsing of the page—these links are referred as browser's links. Links such as but not limited to links to JavaScript, to style sheets, and to images can be referred as browser's links. Other links can be displayed on the surfer's screen for the surfer to select. Those links are referred as surfer's links or user's links. Exemplary surfer's links can be a link to another web page.

While surfing the World Wide Web (WWW), a surfer (a user), utilizing a browser equipped device, may send an HTTP (Hyper Text Transfer Protocol) request to a web server. In response, the web server may send an HTML file of the requested web page. HTML, ML file, HTTP and WWW are well known in the art and therefore they are not further described. A reader who wishes to learn more about them is invited to read in technical books.

Nowadays, millions of users surf the Internet. A growing number of surfers use a handheld device, a mobile device, which can wirelessly surf the Internet and retrieve web pages. Exemplary mobile device can be mobile phones (cellular phones, and smart phones—such as but not limited to the iPhone (a trademark of Apple computers Inc), and so on), PDA (Personal Digital Assistants), etc. In the disclosure, the above names may be used interchangeably and the term mobile device can be used as a representative term for the above group. Usually a mobile device has some limitation in comparison to a common computer (such as personal computer or a laptop). Exemplary limitation can be: a smaller screen, limited computing power, limited storage capabilities, inability to support JavaScript, limited keyboard capabilities, etc.

There are different types of device capabilities. There are devices that require content adaptation for surfing and there are devices that don't require content adaptation, for example. There are a myriad of combinations of device-browser. In addition there are different types of websites. An exemplary website can be a mobile aware website. An exemplary URL of a mobile aware website can be websites ending with ".mobi", or a URL starting with WAP instead of starting with WWW. Other websites may not be aware to the capabilities of mobile devices.

There are cases in which a service provider, which can be located over an intermediate node between the surfers and the web servers, would like to add, on the fly (while rendering a webpage to a surfer), additional data to requested web pages. The additional added data can be a banner with a logo of the service provider, a link to other web pages, an advertisement, news, a surfer's bookmarks (the user's favorite websites), etc. Service providers may store the user's favorite web page, and may handle the user's bookmarks, for example. The banner can be placed as a header at the top of the rendered web page or as footer at the bottom of the rendered web page, for example. Such capabilities can be used for informing a user of the mobile device about locale or current events, or to get the surfer's bookmarks that are stored at a cellular operator's premises, for example. Therefore, adding data to a web page will increase the user's surfing experience.

However, due to the limitation of mobile devices, the huge number of different combinations of devices and browsers and the number of different web pages, it can be complicated to add the additional data to a web page while it is rendered to a surfer using a mobile device. An existing technique uses a common content adaptation server. A content adaptation server is a powerful and complicated machine and consequently an expensive one. The content adaptation server intercepts the data transportation between a plurality of mobile devices and a plurality of web servers, processes and modifies the received web page in order to adapt them to the combination of mobile device-browser, which is the destination of each of the web pages. Using a content adaptation server only for adding banners, footers or headers, to a web page is an expensive solution.

Therefore there is a need for a simple system that can add the additional data to a web page when rendering them to surfers that use the mobile device. Such a system can be installed at a service provider's premises, for example, in an intermediate node between the surfers and the web servers. A service provider can be a cellular operator, a Public Switched Telephone Network (PSTN) operator, data network operator, an access network service provider, an Internet Service Provider (ISP), etc.

BRIEF SUMMARY

Exemplary embodiments of the present invention seek to provide novel apparati and methods to solve the above-described needs by providing a system and method that adds additional data (a banner, footer or a header, for example) to a web page while it is transferred toward a mobile device. An exemplary system can be installed at an intermediate node between a surfer and the Internet. Such an intermediate node can be at a service provider premises (SPP), for example. The service provider can be a telecom operator, such as but not limited to, a cellular service provider, a satellite communication service provider, a Public Switched Telephone Network (PSTN) operator, an access network service provider, etc. Other exemplary embodiments of the present invention can be installed at an Internet Service Provider (ISP) premises, for example. Henceforth, the description of different embodiments of the present invention may use the term 'footer' as a representative term for any of the various forms of added data unless specifically limited to a particular type of additional added data.

Exemplary added data can include: information that is related to the service provider, links to updated news, traffic information, surfer's bookmarks, a logo of a service provider, etc. Thus, embodiments of the present invention can improve a user's experience while surfing the Internet by providing useful additional data to a requested web page. An exemplary embodiment of the present invention can reside at the service provider's premises between a plurality of browsing mobile devices and a plurality of web sites and intercepts the data traffic between the mobile devices and the web sites—surfer's requests for web pages (HTTP requests, for example) and their responded ML files (HTML files, for example). The data traffic can be parsed in order to define the type of the device and its browser by using a field in the header that is associated within the request, a field such as but not limited to user-agent field. The type of the responding web site is also analyzed, for example. The user-agent can reflect the combination of the requesting mobile device and its browser application. It should be noted that the terms "user-agent" and "device" may be used interchangeably herein.

An embodiment of the present invention can divide the user-agents into two groups: a user-agent that requires content adaptation and a user-agent that does not require content adaptation. The web sites, from which a web page is requested, can also be divided into two groups: mobile aware web sites (MAWS) or non-mobile-aware web sites (NMAWS).

In case the device does not require content adaptation, then an exemplary embodiment of the present invention can add a JavaScript (JS). The JS can overcome a situation in which another one or more JS codes that are included in the web page may create one or more internal ML files (iFrames, for example). In such a case, a footer could be added to the one or more internal ML files instead of one instance at the end of the web page. The added JS can prevent such a case by adding the footer only if it is in the top window of the page. In case a footer has not yet been implemented at the requested web page, then a code can be generated at the end of that web page that will create a link to a footer or the footer itself.

In addition to the JS, a code can be added to be used in cases that the JavaScript option is not activated. Such a code can be implemented using <noscript> scheme which is parsed by a browser that was configured not to activate the JavaScript option.

In case the device requires content adaptation and the website is a non-mobile-aware web site (NMAWS), then an exemplary embodiment of the present invention can send the received web page toward a content adaptation server (CAS). In one exemplary embodiment of the present invention, the content adaptation server is configured to add a footer at the end of the adapted ML file and to send the adapted ML file with the footer toward the requester. Yet in another exemplary embodiment of the present invention, the content adaptation server can be configured to add a place-holder to the end of the adapted web page and to send the adapted web page with the place-holder back to the exemplary embodiment of the present invention, in which the adapted web page is parsed and the place-holder is replaced by an appropriate footer.

In the case that the device requires content adaptation but the website/content is a mobile aware web site (MAWS), then an exemplary embodiment of the present invention can parse the received requested HTML looking for an appropriate place at the HTML file and add the footer there.

Other objects, features, and advantages of the present invention will become apparent upon reading the following detailed description of the embodiments with the accompanying drawings and appended claims.

The foregoing summary is not intended to summarize each potential embodiment or every aspect of the present disclosure, and other features and advantages of the present disclosure will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

BRIEF DESCRIPTION OF THE SEVERAL VIEWS OF THE DRAWING

Exemplary embodiments of the present invention will be understood and appreciated more fully from the following detailed description, taken in conjunction with the drawings in which.

DETAILED DESCRIPTION

Turning now to the figures in which like numerals represent like elements throughout the several views, exemplary embodiments of the present invention are described. For convenience, only some elements of the same group may be labeled with numerals. The purpose of the drawings is to describe exemplary embodiments and not for production. Therefore, features shown in the figures are chosen for convenience and clarity of presentation only.

Figure 1:
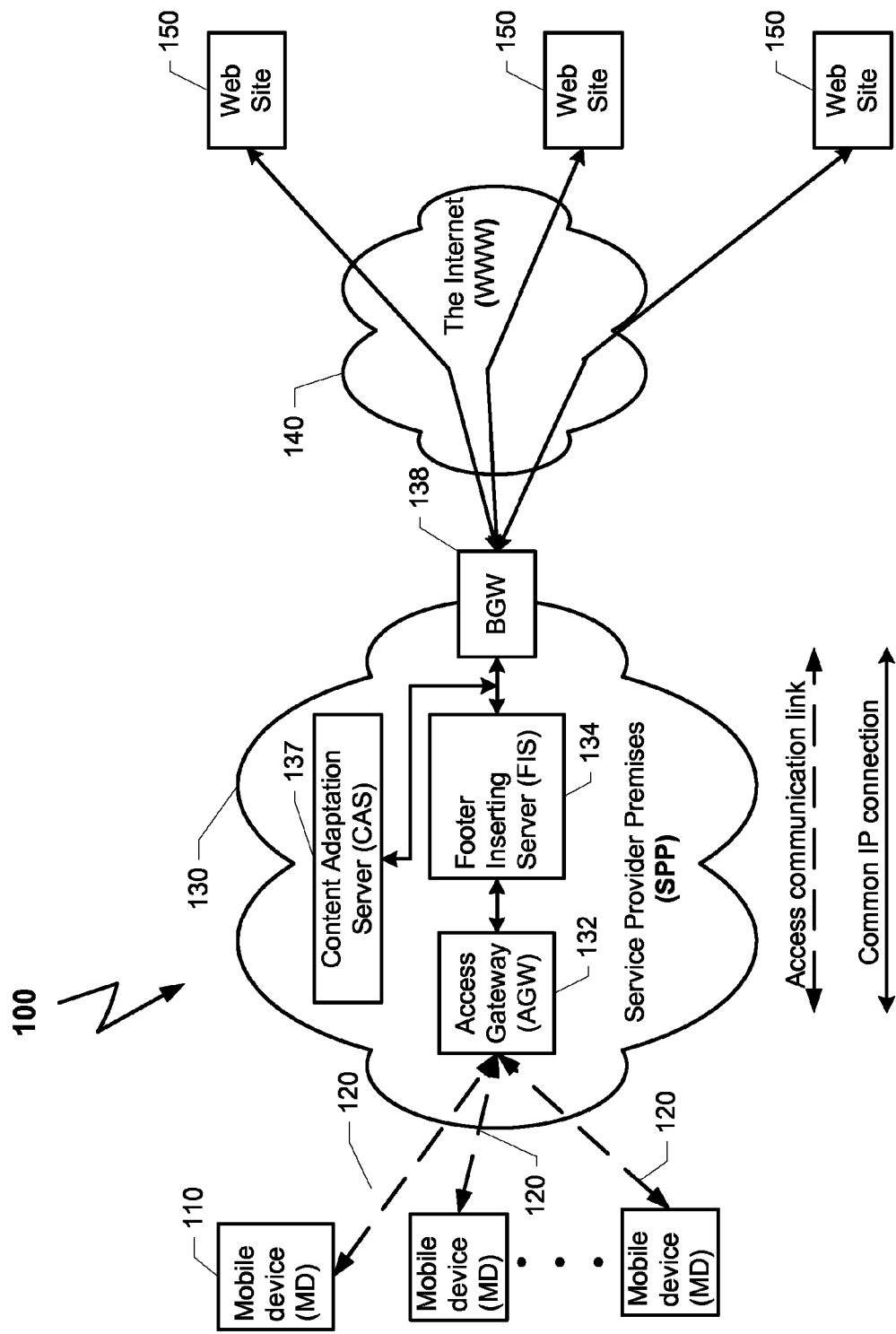
FIG. 1 illustrates a block diagram with relevant elements of an exemplary communication system that implements an exemplary embodiment of the present invention.

FIG. 1 depicts a block diagram with relevant elements of an exemplary communication system 100 that implements an exemplary embodiment of the present invention. A communication system 100 has been selected as an exemplary environment that is suitable for implementing exemplary techniques of the present invention. The communications system 100 may be a cellular data communication network, satellite networks, access networks, Internet Service Provider (ISP), or other type of network or communication system. Within the context of this description, the terms cellular, satellites, wireless, and ISP may be used interchangeably and at times, may have the same meaning.

System 100 may comprise a plurality of mobile devices 110 (MD); a service provider premises (SPP) 130, a network 140 such as but not limited to the Internet, which can be referred also as the world wide web (WWW); and one or more Web Sites 150. An exemplary SPP 130, among other elements, may comprise an access gateway (AGW) 132, a footer inserting server (FIS) 134 and a border gateway (BGW) 138. Furthermore, the SPP 130 may comprise a content adaptation server 137 (CAS). It should be noted that in the illustrated SPP 130, the only modules depicted are elements that are relevant to the Internet Protocol and to embodiments of the present invention. Within the context of this description, the terms "content server" and "web site" may be used interchangeably and at times, may have the same meaning.

It will be appreciated by those skilled in the art that, depending upon its configuration and the needs, that system 100 may comprise any other number than three of web sites 150 and mobile devices 110. However, for purposes of simplicity of understanding, three units of each are shown. It should be noted that the terms "mobile device", "endpoint", "client", "surfer", "user's device", "client device" and "user" may be used interchangeably herein.

System 100 is based on the Internet Protocol (IP). It may represent one or more network segments, including but not limited to one or more Internet segments, one or more Intranets, etc. System 100 may run over one or more types of physical networks, such as but not limited to, the Public Switched Telephone Network (PSTN), an Integrated Services Digital Network (ISDN), a cellular network, a satellite network, etc. It may also run over a combination of two or more of these networks. System 100 may include intermediate nodes along the connection between a mobile device and a web site. The intermediate nodes may include, but are not limited to: IP service provider servers, cellular service provider servers and other type of service providers' equipments.

A plurality of mobile devices 110 may be served by the System 100 and able to access the web site 150 via the SPP 130 and the Internet 140. A common mobile device 110 may run a browser software application in order to surf the network and to communicate with one or more web sites 150. An exemplary browser application can be the INTERNET EXPLORER MOBILE (a trademark of Microsoft), for example. An exemplary mobile device 110 can be a cellular telephone or handset, a handheld computer, a personal data assistant (PDA), or any other computing device with communication capabilities, etc.

The plurality of mobile devices 110 are connected via a plurality of communication links 120 to the Access Gateway (AGW) 132 within the SPP 130. The connection between the mobile devices 110 and the SPP 130 may be via intermediate nodes (such as but not limited to a base station) not shown in FIG. 1. The AGW 132 acts as an access gateway between the communication protocols that are used over communication links 120 and the IP network that is used over the SPP 130. An exemplary AGW 132 handles the physical layer, data link layer, up until the network link layer. The AGW 132 forwards the IP packets received from the mobile device 110 toward the footer inserting server 134 (FIS), and vice versa. An exemplary AGW 132 may be a Remote Access Server (RAS), Gateway GPRS Support Node (GGSN), Packet Data Serving Node (PDSN), CDMA2000 Radio Access Network (RAN) or any other similar node.

The Border Gateway (BGW) 138 is the interface between the Internet 140 and the SPP 130. The BGW 138 may route the uploaded communication toward the appropriate destination over network 140. In case that the uploaded transportation is a request for a web page, the BGW 138 routes the request to the appropriate web sites 150. The terms BGW and the Border Router may be used interchangeably throughout this description. In the download direction, the BGW 138 receives incoming packets from the different web sites 150 and distributes them to the appropriate modules of the SPP 130.

An exemplary embodiment of the footer inserting server 134 (FIS) can parse user's (mobile devices) requests passed via the AGW 132 in one direction, the HTTP requests for example. In the other direction, the footer inserting server 134 (FIS) can parse the web pages, the ML files that describe the web-page, for example, received from the web sites 150 via the BGW 138. The footer inserting server 134 (FIS) can identify the user's device and browser capabilities by parsing a user-agent field, for example. The FIS 134 may identify if the device is a smart device (windows mobile, iPhones, etc.). A smart device can be a device that will not require content adaptation.

The FIS 134 may identify features of the web site 150 that stores the requested web page. Features such as, but not limited to: a mobile aware web site, for example. Different examples of mobile aware web sites can be: websites with internet address extension .mobi, or web page starting with WAP instead of WWW, and so on. According to the detected capabilities of the mobile device and its browser with the web site features, the FIS 134 may decide how to insert a footer into the web page or whether to transfer the web page via the content adaptation server 137 (CAS) as part of the footer inserting process. The CAS 137 can be a common/commercial content adaptation server that can adapt a received web page according to the capabilities of the mobile device and its browser. An exemplary CAS 137 can be OPENWEB made by OPENWAVE, for example.

The FIS 134 may also manage and up-date or may be associated with databases (DB) and/or tables. The DB may contain information on the different mobile devices 110, and the different websites 150. Information such as but not limited to: the mobile device capabilities (browser, screen size, memory volume, smart device or not, JavaScript support or not, etc.), information on the web pages (mobile aware or not, etc.) In some embodiments, the FIS 134 may be transparent to both sides of the connection, to the mobile devices 110 and\or to the web sites 150. More information on the operation of the FIS 134 is depicted below in conjunction with FIGS. 2-4.

Figure 2:
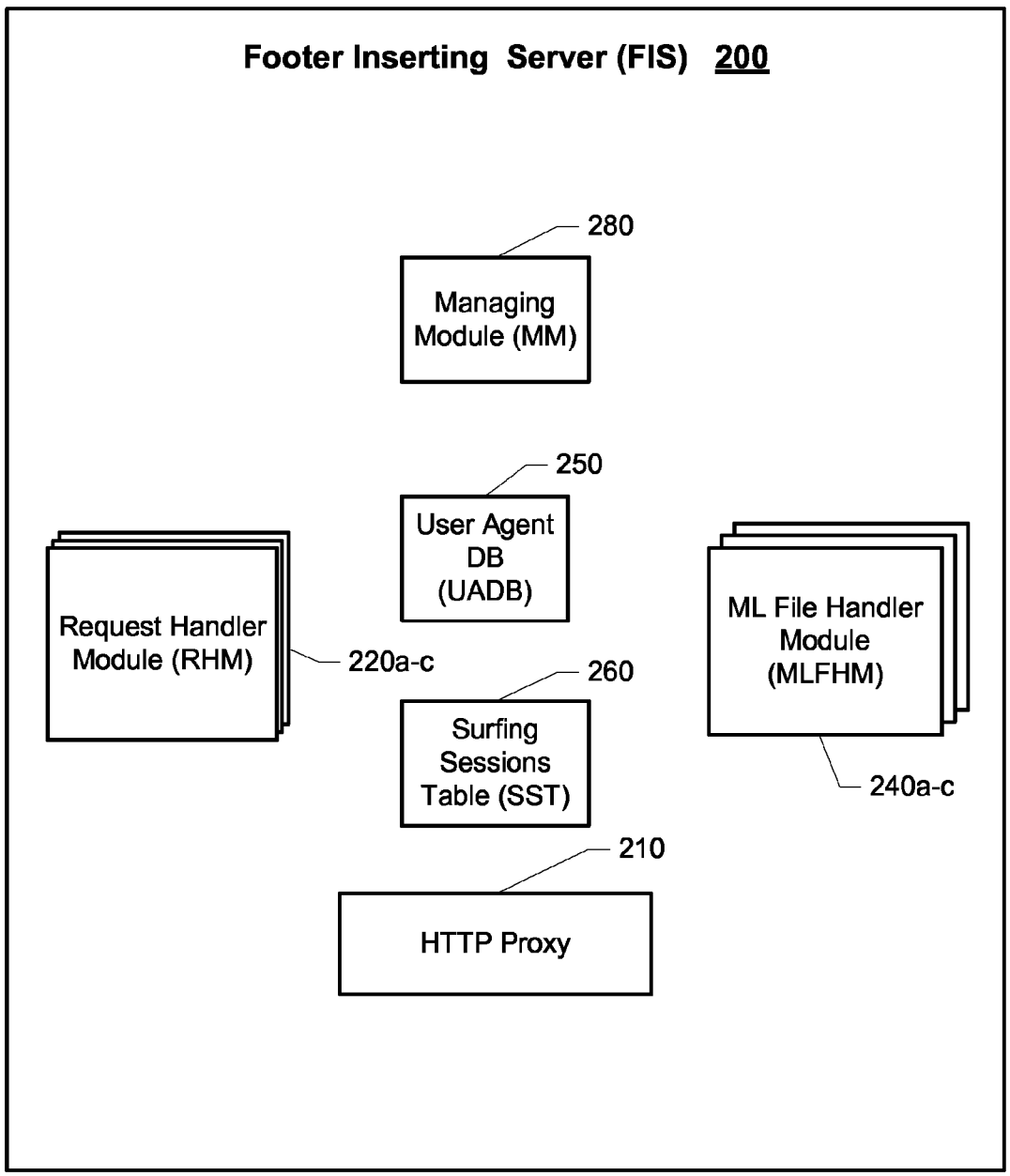
FIG. 2 illustrates a block diagram of relevant elements of an exemplary embodiment of the present invention.

FIG. 2 is a block diagram with relevant elements of a footer inserting server (FIS) 200 that operates according to an exemplary embodiment of the present invention. The FIS 200 may be associated with an SPP 130 (FIG. 1). The FIS 200 can be sandwiched between the AGW 132 (FIG. 1) and the BGW 138 (FIG. 1). The FIS 200 may intercept and transfer mobile device's 110 requests to web page 150 (FIG. 1) received via the AGW 132 and responded web pages that were received via the BGW 138. Within the context of an Open System Interconnection (OSI) Reference Model seven layer communication stack, an exemplary FIS 200 can be implemented by modules on top of an HTTP proxy.

An exemplary embodiment of an FIS 200 may comprise an HTTP proxy 210; one or more Request Handler Modules (RHM) 220a-c, adapted to handle requests coming from the endpoint mobile devices 110 (FIG. 1) that are transferred via the AGW 132; one or more ML File Handler Modules (MLFHM) 240a-c, adapted to handle ML files received from web sites 150 and transferred via the BGW 138; a user-agent database (UADB) 250; a surfing sessions table (SST) 260; and a managing module (MM) 280. It will be appreciated by those skilled in the art that depending upon its configuration and the needs, the FIS 200 may comprise a number other than three of RHM 220a-c, and MLFHM 240a-c. However, for purposes of simplicity of understanding, three units of each are shown.

In an exemplary embodiments of the present invention in which the communication between the modules of the SPP 130 (FIG. 1) is based on IP (Internet Protocol), the HTTP proxy 210 can be adapted to handle the first four layers of the OSI seven layer communication stack. The layers can be the Physical Layer, Data Link Layer, Network Layer, and Transport Layer. In exemplary embodiments of the present invention, the FIS 200 can be transparent to the mobile devices 110 (FIG. 1), as well as to the web pages 150 (FIG. 1). The HTTP proxy 210 may behave as a transparent proxy and may use a redirector, for example. In an alternate exemplary embodiment of the present invention in which the FIS 200 can be configured as an HTTP proxy at the terminals 110 (FIG. 1), a redirector is not needed. The HTTP proxy 210 can be adapted to collect packets coming from the plurality of mobile devices 110 (FIG. 1) or responses web pages from the web sites 150 (FIG. 1) and forward them into internal modules of FIS 200.

HTTP requests coming from mobile devices 110, via AGW 132 (FIG. 1), can be intercepted by HTTP proxy 210 and transferred toward one of the RHM 220a-c. Exemplary configuration embodiments of the RHM 220a-c can be such, but not limited to: one RHM 220 module handles one HTTP request at a time, or a plurality of RHM 220 modules handling the several HTTP requests in parallel, for example.

ML files (HTML) received from web sites 150, via the BGW 138 (FIG. 1), can be intercepted by HTTP proxy 210 and transferred toward the MLFHM 240a-c. Exemplary configuration embodiments of the MLFHM 240a-c can be such, but not limited to: one MLFHM 240 module handles one ML file (HTML) at a time, or a plurality of MLFHM 240 modules handling in parallel several ML files (HTML), for example.

In the case where the HTTP proxy 210 receives an HTTP request for an object that is included in a web page, or receives an object that is included within a web page, the HTTP proxy 210 will transfer the request or the object to its destination without modifying it.

Henceforth, the description of the present invention may use the term "session" as a representative term for an HTTP request for a web page by a MD 110 (FIG. 1) and its web site's ML file response. Per each session, the HTTP proxy 210 adds an entry in the surfing session table 260 (SST). Exemplary information comprised in an entry of the surfing session table 260 (SST) can be, but is not limited to: the ID number of the session; user's identification (the user MSISDN); IP address and IP port number of destination, IP address and IP port of source; information on the requested web site 150 and its features; time of the last transaction of the session; the URL of the requested web page; user agent group; web site group (mobile aware web site, for example); internal ML files (if-rames, or frames, for example); and so on. In addition, each entry may include fields for monitoring and managing information, such as but not limited to: the last time the entry for a session was up-date, the number of times it was used, etc.

An exemplary HTTP proxy 210 can be adapted to get processed (modified) requests and/or responses from the internal modules of the FIS 200; arrange the modified requests and/or responses according to the communication protocol into IP packets and transfer the packets according to the destination address. The destination address can be the appropriate MD 110 via the AGW 132 (FIG. 1). Alternatively, the destination address can be the appropriate website 150 (FIG. 1) via the BGW 138.

A Managing Module 280 can be a module, which can be initiated during power on of the FIS 200. During initiation, the Managing Module 280 (MM) can be introduced to the FIS 200 internal modules. Resources, which are relevant to the operation of the Managing Module 280, can be allocated and reset. Resources such as counters, clock, timer; memory, etc. The Managing Module 280 can be updated with different parameters such as, but not limited to the CAS 137 (FIG. 1) address, the UADB 250 for an external DB, etc. The Managing Module 280 can allocate resources for each one of the internal modules of the FIS 200 (RHM 220; SST 260; HTTP PROXY 210; and MLFHM 240, for example) and may initiate them.

During operation, the Managing Module 280 can monitor the operation of the FIS 200 and in cooperation with the HTTP proxy 210, it may create or release one or more RHM 220a-c or MLFHM 240a-c. The Managing Module 280 can include a UADB 250 updating program. The updating program will be initiated from time to time by an administrator of the SPP 130 (FIG. 1) with updated information of user-agent types, for example. In an exemplary embodiment of the present invention, the Managing Module 280 can include an SST 260 entry releasing program. An exemplary SST 260 entry-releasing-program can monitor the activity of each session. Upon determining that the session is idle or has ended, the relevant entry in the SST 260 table can be released. The decision can be based on the duration from the last transaction, for example.

The UADB 250 can be an internal or external database, a persistence memory, for example. Each entry in the UADB 250 can include, among other, fields: user-agent field; mobile device capabilities (whether a mobile device 110 is a smart device; whether the user's device 110 needs content adaptation or not; which browsers does the mobile device 110 comprise, screen size, etc.). The UADB 250 can be accessed by an RHM 220 upon receiving a request for a web page and retrieving the relevant field from the header, such as but not limited to the user agent field that is associated with the request. The user agent is used as in index for fetching the appropriate entry from the UADB 250 with the capabilities of the requesting MD 110.

The RHM 220 is capable of handling requests coming from the mobile devices 110 (FIG. 1). A request can be for an HTML file (a web-page) for example. A request for an ML-file is parsed and an entry is allocated to the session at SST 260. Session identification parameters such as, but not limited to, the user ID number, IP addresses and IP ports of the source and the destination of the request, the URL of the request, etc. A user ID can be an MSISDN (Mobile Station International Subscriber Directory Number) for example. The MSISDN can be delivered from another node in the SPP 130 (FIG. 1).

An exemplary request handler module 220 (RHM) parses the received HTTP requests from mobile devices 110 (FIG. 1). The RHM 220 can access the appropriate entries in the UADB 250 according to the received user-agent field, for example. The RHM 220 can up-date the appropriate filed in the SST 260 with the relevant information regarding the mobile device 110 requesting a web page. Exemplary information such as, but not limited to: whether the mobile device 110 is a smart device or not, the browser that the device comprises, memory limitations, screen size. etc. In addition, the RHM 220 parses the destination web site's URL. The RHM 220 may determine from the web site's URL if the destination web site is a mobile aware web site, does it comprise a rich dynamic and complicated content, etc. The RHM 220 can up-date the surfing sessions table 260 (SST) with the information retrieved from the user-agent field, the web site URL, relevant information from the UADB 250, for example. Exemplary request handler module 220 (RHM) can identify requests for an internal ML file. The URL of internal ML files in a web page is marked by ML file handler module 240 (MLFHM). The RHM 220 can search for the mark in the URL of a requested web page. If RHM 220 identifies a mark in the URL, it updates the appropriate entry on the SST 260 that the certain web page is an internal ML file and should not be modified, for example. Additionally, the RHM 220 will remove the mark and restore the original URL (meaning the URL before modified by the ML file handler module 240). More information on the marks in the URL will be disclosed in the paragraph describing the MLFHM 240 below. The RHM 220 returns the intercepted HTTP request to HTTP proxy 210 to be sent toward the appropriate web site 150 (FIG. 1).

The MLFHM 240 can be capable of handling ML-files, such as, but not limited to, HTML files that are transferred from web sites 150 (FIG. 1) to mobile devices 110 (FIG. 1) via the FIS 200. An exemplary MLFHM 240 may receive from the HTTP proxy 210 an ML file. The MLFHM 240 can parse the ML file and search at the SST 260 for the entries storing information on the session that is associated with the received ML file. Information such as, but not limited to: information on the capabilities of the mobile device 110 (FIG. 1) requesting that ML file; information on the features of the web site 150 (FIG. 1) from which the ML file is received (is it mobile aware or not, for example), whether the request for the web page is marked or not; and so on.

An exemplary MLFHM 240, based on the information retrieved from the relevant entry in SST 260, determines whether the request was marked, reflecting that the request was for internal ML file which is embedded within a main HTML file. In case the HTML is a main HTML file (the request was not marked), the MLFHM 240 may insert the appropriate footer. If the request to the ML file was marked, the received ML file is an internal HTML file that is embedded within a main HTML file. An internal HTML file can describe an iframe, a frame, etc. The MLFHM 240 may add a mark at the URL of an internal ML file to mark it as an internal one, for example. The mark will later be parsed by the RHM 220 that will update, accordingly, the SST 260 whether the HTML file should be modified to include a footer, for example. More information is depicted below in conjunction with the flowcharts in FIGS. 3A-3C and FIG. 4.

Once the MLFHM 240 ends the parsing and adding of a footer when needed, the MLFHM 240 transfers the processed ML file to the HTTP proxy 210 to be sent toward the requesting MD 110. The entry in the SST 260 that was associated with this session can be released and the MLFHM 240 is ready to process a next ML file. In other exemplary embodiments of the present invention, the entry in the SST 260 can be released also upon determining that the session between the MD 110 (FIG. 1) and the web site 150 (FIG. 1) became idle\ has ended.

In case the MLFHM 240 identifies that the mobile device 110 does not require content adaptation), then an exemplary embodiment of the MLFHM 240 can add a JavaScript (JS). The JS can overcome a situation in which another one or more JS codes that are included in the web page may create one or more internal ML files (iFrames, for example). In such a case, a footer could be added to the one or more internal ML files instead of one instance at the end of the web page. The added JS, by the MLFHM 240, can prevent a plurality of footers by adding the footer only if it is in the top window of the page. In case a footer has not yet been implemented at the end of the requested web page, then a code can be generated at the end of that web page that will create a link to a footer or the footer itself. The MLFHM 240 can generate an additional code that will identify the end of the requested web page. Exemplary code can parse the ML file and search and mark the end of the HTML body. If the end of the HTML body cannot be found, the code can search and mark the end of the HTML file or the end of the document, and so on. In addition to the JS, a code can be added to be used in cases where the JavaScript option is not activated. Such a code can be implemented using <noscript> scheme which is parsed by a browser that was configured not to activate the JavaScript option.

Yet in an alternate exemplary embodiment of the present invention visible/invisible style attributes can be used and be added to a footer. In such embodiment, a JS can be added too. The JS, when it is activated by a browser, can check the Document Object Model (DOM) of a received ML file and determine whether it is the main HTML file, the first that was requested by the browser, the one that was initiated by a surfer. If it is the main HTML file, then the invisible style attribute is converted to visible.

In case the MLFHM 240 identifies that the mobile device 110 requires content adaptation and the website 150 is a non-mobile-aware web site (NMAWS), then the MLFHM 240 can send the received web page toward the content adaptation server (CAS) 137 (FIG. 1). In one exemplary embodiment of the present invention, the content adaptation server 137 (FIG. 1) is configured to add a footer at the end of the ML file or add a place-holder to the end of the web page and to send the adapted web page with the place-holder back to MLFHM 240. Upon receiving the adapted ML file from CAS 137, the MLFHM 240 can replace the place holder with the footer, to be presented.

In the case that the device requires content adaptation and the website is a mobile aware web site (MAWS), then MLFHM 240 can parse the received requested HTML looking for an appropriate place in the HTML file and add the footer there. More information is depicted below in conjunction with the flowcharts in FIG. 3 and FIG. 4. FIG. 3 is a flow diagram illustrating relevant steps of an exemplary process 300 that can be used for handling an ML file such as, but not limited to, an HTML file or XHTML file, etc. Further, the process describes steps that occur when an HTML file is transferred from a web site 150 (FIG. 1) to a mobile device 110 (FIG. 1) via the FIS 200 (FIG. 2). The process 300 can be implemented by the MLFHM 240*a-c* (FIG. 2). The process 300 can be initiated by the MM 280 upon power up of the FIS 200 (FIG. 2). In another exemplary embodiment, the process 300 can be initiated upon receiving a new ML file via the HTTP proxy 210 (FIG. 2). In one embodiment, several processes 300 can run in parallel, one per each HTML file, depending on the load over the FIS 200 and the available resources. In alternate exemplary embodiments (not shown in the drawings), the process 300 can run in a loop. A loop can be initiated per each received HTML file.

During initiation 302, the MLFHM 240 (FIG. 2) can be introduced to surfing session table 260 (SST) (FIG. 2), to Managing Module 280 (FIG. 2), etc. Resources, which are relevant to the operation of the MLFHM 240 (FIG. 2), can be allocated and reset. Resources such as counters, clock, timer, memory, etc.

The process 300 receives 303 an ML file and fetches the relevant entry from the surfing session table 260 (FIG. 2). The content of the entry is parsed 303. If 304 the ML file is a Wireless ML file (WML) then the process 300 proceeds to step 390 (FIG. 3C), more information is depict in FIG. 3C. An WML file can be detected by parsing the content type field in the header of the received ML file, for example.

If 304 the ML file is not a Wireless ML file (WML) (meaning it can be an HTML, XTML, and so on) then the process 300 examines whether 306 the ML file is a redirection HTTP response. The process 300 can detect that it is a redirection HTTP response according to the web server's 150 (FIG. 1) reply. The HTTP response 30× (302 response, for example) received from the web server 150 can be a redirection one, for example. A redirection response can be sent by a web server 150 (FIG. 1) to a mobile device's 110 (FIG. 1) browser in the event that a web page address has been changed, for example. Redirection response may include the new web page address (URL). If it is a redirection response, then the process 300 parses 308 the redirection, examines whether the redirection response has been sent as a response to an internal frame. If it is a response to an internal frame, the process 300 marks 308 the new URL, sends the modified redirection HTTP response toward the user 110 (FIG. 1), releases the relevant entry in the SST 260 (FIG. 2), and the process 300 ends. If it is not a response to an internal frame, the process 300 sends 308 the redirection HTTP response as is toward the user 110 and releases the relevant entry in the SST 260 and the process 300 ends.

Returning now to step 306, if the ML file is not a redirection HTTP response, then a decision is made 310 whether the ML file is an internal ML file (iframe, or frame, for example). The decision can be based on the information whether the request was marked or not, stored in the relevant entry of SST 260 (FIG. 2). If it is 310 an internal ML file, then the process 300 parses the internal ML searching 312 for links to further internal ML files, a second generation of internal ML files which are embedded within an internal ML file. Searching for a second or above generation of internal ML files can be done in a similar way for searching links to internal ML, which is described below in conjunction from steps 322, 324 to the end of the process 300 without inserting the footer. Then, the processed internal ML file is sent 312 to the requesting mobile device's 110 browser, and the relevant entry in the SST 260 is released. Then process 300 then ends.

If 310 it is not an internal ML file, then the process 300 proceeds to step 314. At step 314, a decision is made whether the mobile device 110 (FIG. 1) is a smart device. The information is stored in the relevant entry in the SST 260. If 314 the device is a smart device, then the process 300 proceeds to step 322. If 314 the device is not a smart device, then the process 300 inspects the relevant entry in the SST 260 in order to determine 320 whether the web site 150 (FIG. 1) is a mobile aware site (MAWS). If 320 the web site 150 is not a mobile aware site, then the process 300 proceeds to step 384 in FIG. 3C for processing a received ML file from the CAS. If 320 the web site 150 is a mobile aware site, then the process 300 proceeds to step 322.

At step 322 the ML file is parsed in order to determine if the footer can be entered and where. The process 300 can search 322 the ML file for a string indicating a beginning of a frameset (<frameset>) or a beginning of an inline frame (<iframe>), for example. The process 300 can also search 322 for an indication of an end of body tag, or end of HTML tag, or end of file (EOF), for example. If 324 a string indicating a beginning of a frameset is found, the process 300 proceeds to step 350 in FIG. 3B. If 324 an indication of a beginning of an inline frame is found, then the process 300 adds 332 a string mark in the source URL and returns to step 322.

If 324 an indication of an end of body or end of HTML or EOF was found, then the process 300 compares 336 the ML file size with the MD capabilities. If there is an available place for a footer, then the process 300 enters 336 the footer or a link to the footer before the EOF or the found tag, sends 336 the modified ML file toward the mobile device 110, releases 336 the relevant entry in the SST 260, and the process 300 ends. If the process 300 estimates that there is no place for a footer, then the process 300 sends 336 the ML file toward the mobile device 110, and releases 336 the relevant entry in the SST 260, and the process 300 then ends.

Figure 3A:
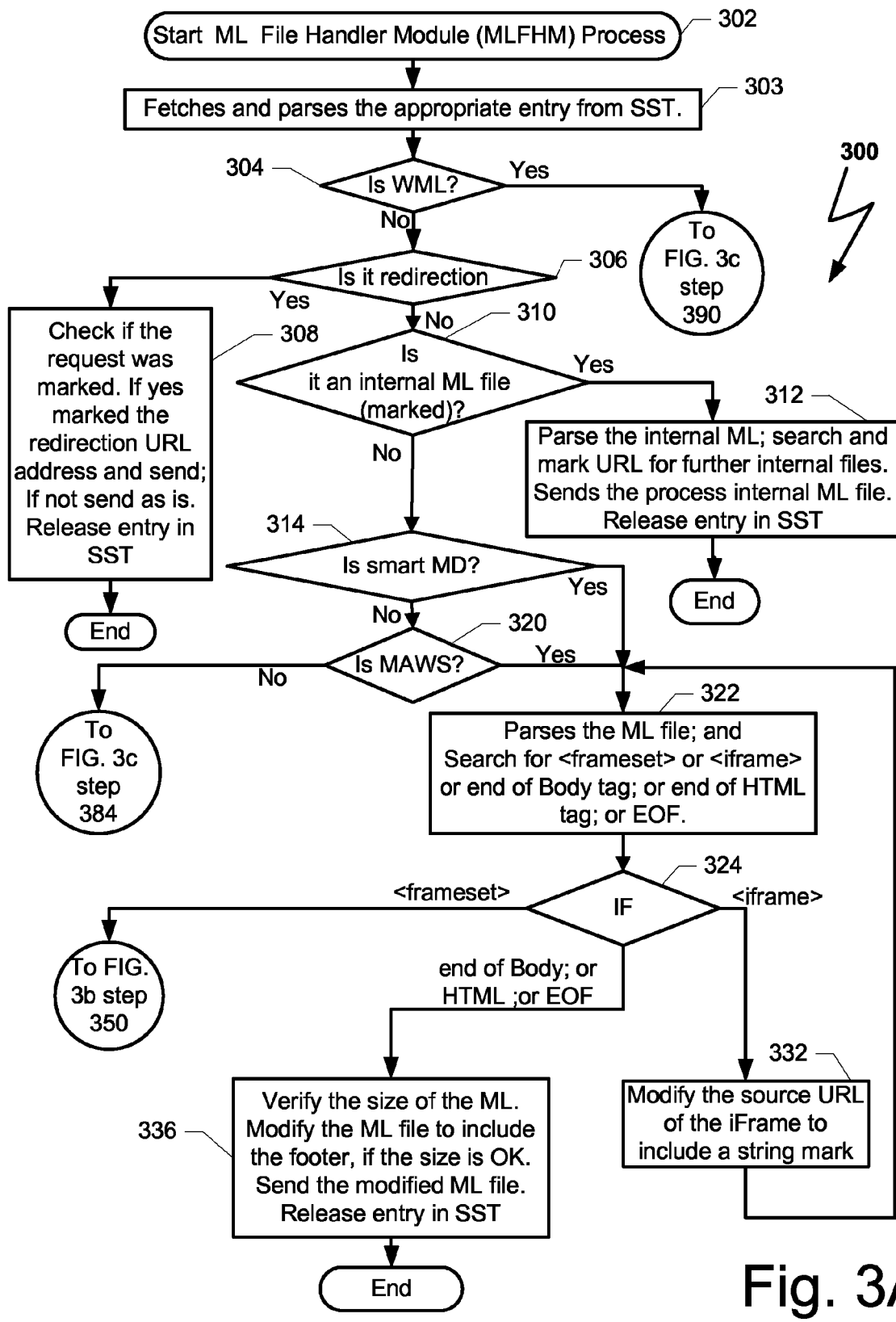
FIGS. 3A-3C illustrate a flowchart with relevant steps of an exemplary method that may be used for handling an ML file.
Figure 3B:
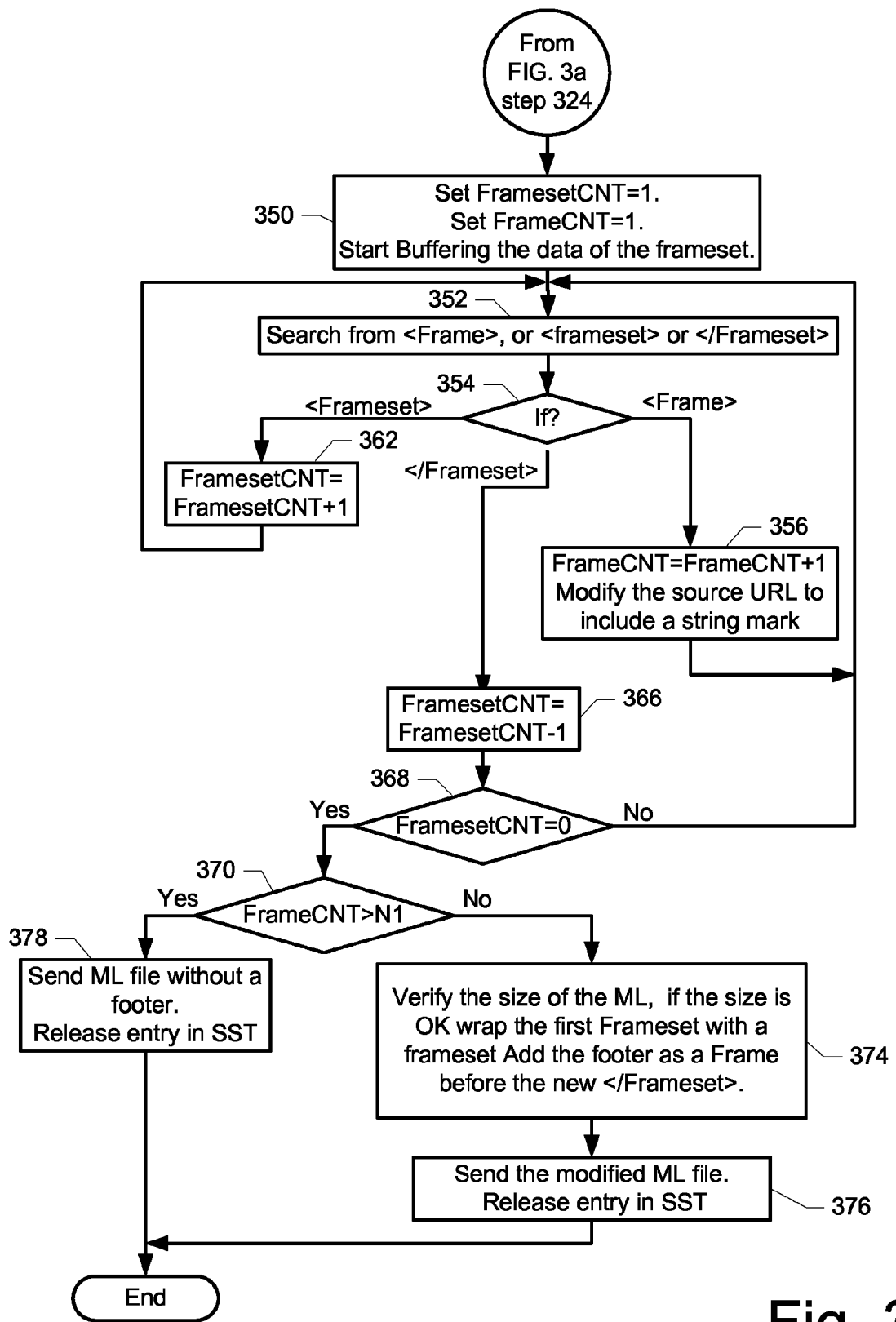

Referring now to FIG. 3B, which is a part of the process 300 and is a flow diagram depicting the case when a beginning of a frameset has been detected at step 324 in FIG. 3A. The process 300 can set 350 the value of a frameset counter (FramesetCNT), a frame counter (FrameCNT) to one and start buffering 350 the data of the framesets and frames.

At step 352 the process 300 can search for the beginning of a frame or the beginning of a frameset, or an end of a frameset. When 354 a beginning of a frame is detected, the process 300 can increase 356 the FrameCNT in one, add 356 a string mark to the source's URL, and return to step 352. When a frameset has been found, then the process 300 can increase 362 the FramesetCNT by one, and returns to step 352.

If 354 an end of a Frameset has been found, the process 300 decreases 366 the FramesetCNT by one. Next a decision is made whether 368 the FramesetCNT value equals zero. If 368 not, the process 300 returns to step 352. If 368 FramesetCNT value equals zero, indicating that the end of the main frameset has been reached, then a decision is made 370 whether FrameCNT>N1. N1 can be a configurable value, N1=8, for example. N1 value can depend on capabilities of the user's device.

If 370 FrameCNT>N1 then the process 300 can send 378 the ML file toward the mobile device 110 (FIG. 1) without adding a footer; the relevant entry in the SST 260 (FIG. 2) can be released, and process 300 then ends. If 370 FrameCNT is smaller than N1, then the process 300 compares 336 the ML file size with the MD capabilities. If there is an available place for a footer, then the main frameset is wrapped 374 with a new frameset. The footer (or link to the footer) can be added 374 as a new frame before the end of the new frameset. Next the process 300 can send 376 the modified ML file toward the mobile device 110 (FIG. 1), and release 376 the relevant entry in the SST 260 (FIG. 2). Next the process 300 ends.

Figure 3C:
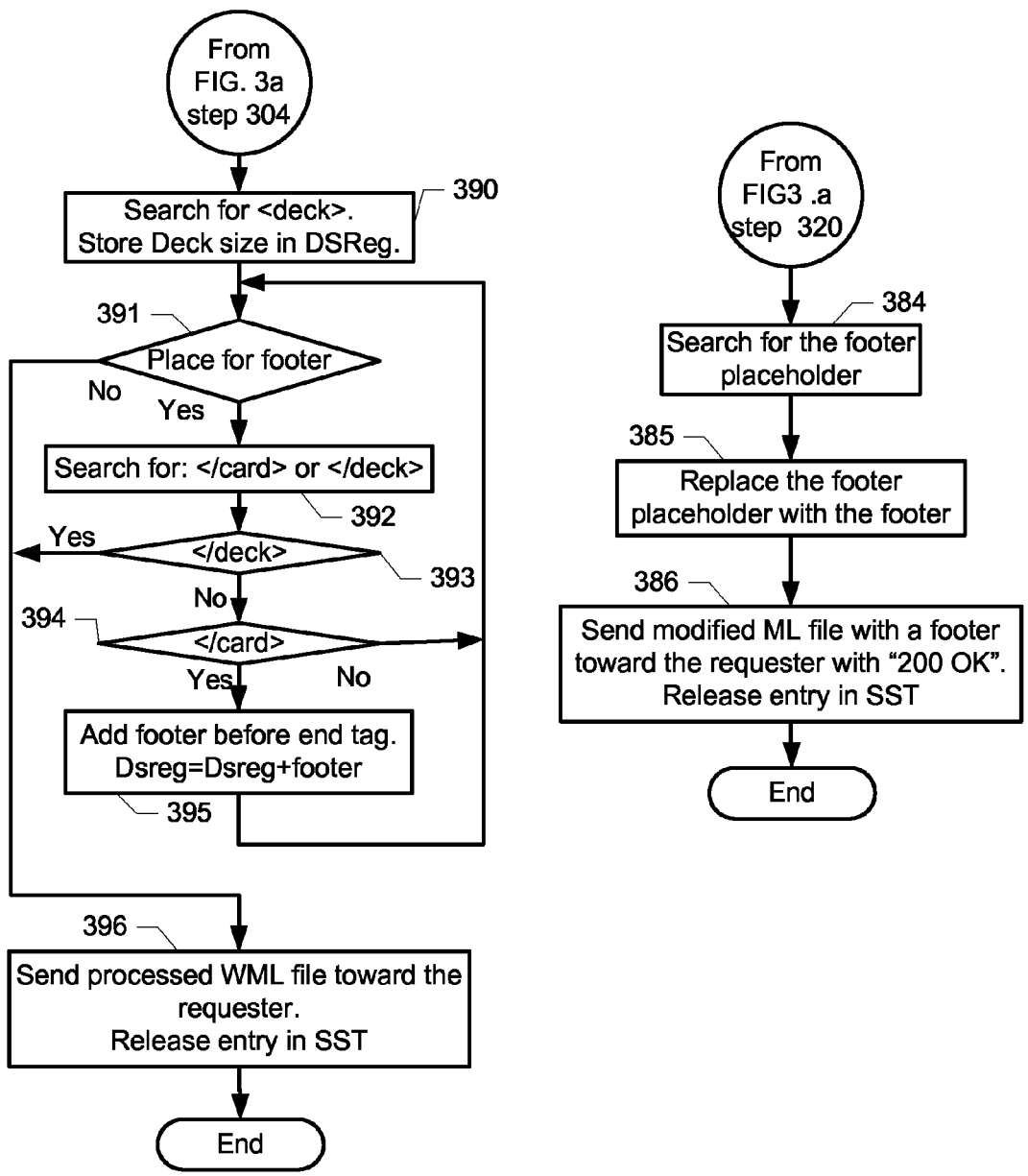

Referring now to FIG. 3C, which is part of the process 300. FIG. 3C depicts two processes: one is a continuation of the process 300 from FIG. 3A step 320, and the second one is a continuation of the process 300 from FIG. 3A step 304. Referring first to the process, which is a continuation of the process 300 from FIG. 3A step 320.

When the process 300 detects that the mobile device 110 (FIG. 1) is not a smart device, and that the web site 150 (FIG. 1) is not a mobile aware, then the received ML file was sent from a content adaption server such as but not limited to CAS 137 (FIG. 1) and the process 300 proceeds to step 384 FIG.

3C. At step 384 the process 300 can search for a footer placeholder. The process 300 can replace 385 the footer placeholder with the footer or a link to the footer. Next the process 300 can send 386 the modified ML file (with the footer) toward the mobile device 110 (FIG. 1). The process 300 can release 386 the relevant entry in the SST 260 (FIG. 2) and ends.

Referring now to the process that is a continuation of the process 300 from FIG. 3A step 304 and depicts the case of Wireless ML files (WML). Wireless ML files are degenerated files in comparison to HTML files, for example. WML files are not composed with framesets, frames, iframes, and so. Instead WML files comprise decks and cards. A reader who wishes to learn more about them is invited to read in technical books.

The process 300 can search 390 for a beginning of a deck. Once found, the process 300 can store 390 the size of the deck in a deck size register (DSReg). The size can be found in a field of the response header of the deck. Next a decision is made 391 whether there is an available place in the deck to enter the footer. The estimation 391 is based on the mobile device 110 (FIG. 1) capabilities, which process 300 can acquire from the relevant entry in the SST 260 (FIG. 2), the value in the DSReg, and the footer's size. If 391 there is no available space for a footer, then the process 300 can send 396 the processed WML toward the mobile device 110; can release 396 the relevant entry in the SST 260 (FIG. 2), and the process 300 ends.

If 391, there is available space for the footer, then the process 300 can search 392 for an end of deck or end of card. If 393 end of deck is found, then the process 300 proceeds to step 396 and sends 396 the processed WML toward the mobile device 110. The relevant entry in the SST 260 (FIG. 2) can be released 396 and process 300 ends. If 393 no end of deck is found, then the process 300 proceeds to step 394. At step 394, if an end of card is found, then the process 300 can add 395 the footer before the end tag, and can increase 395 the Dsreg value by the size of the footer. Next, the process 300 returns to step 391. If at step 394 an end of card is not found, then the process 300 returns to step 391.

Figure 4:
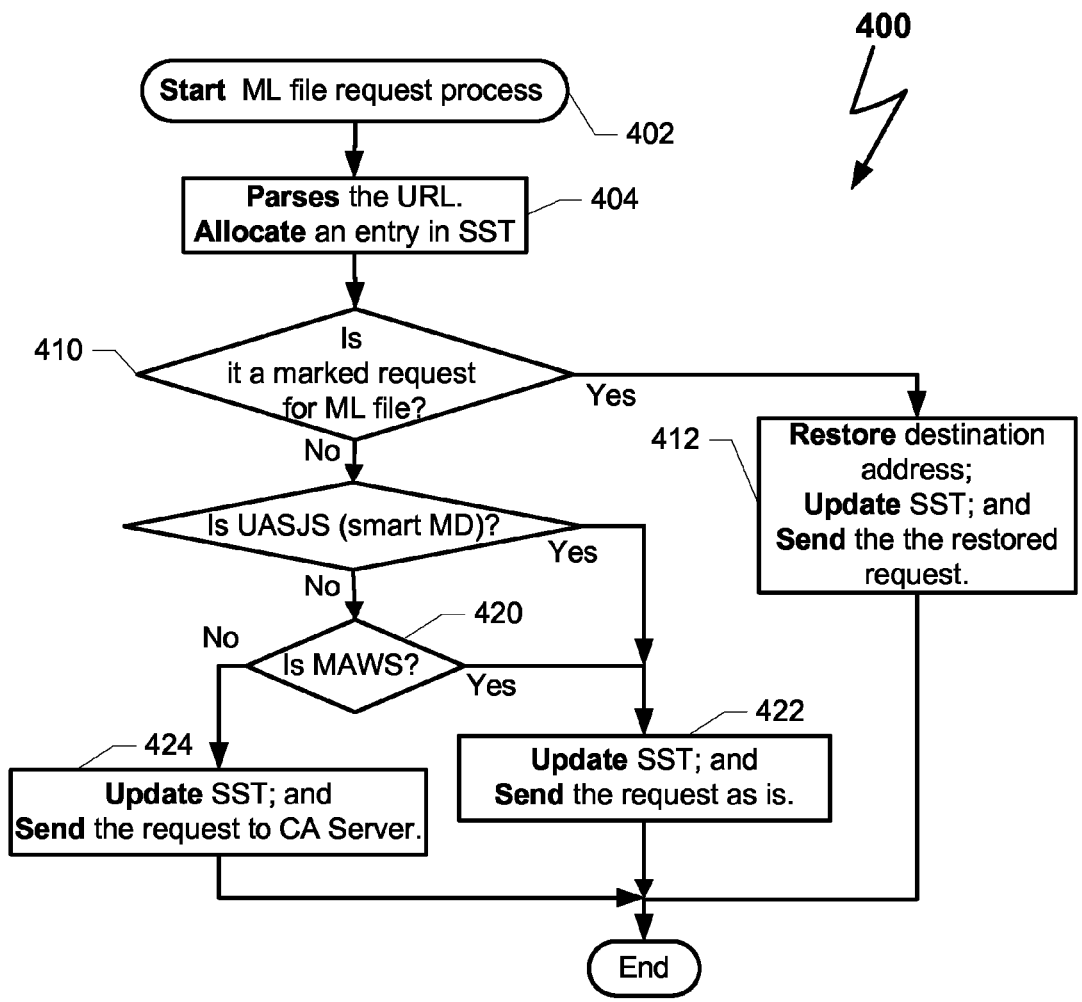
FIG. 4 illustrates a flowchart with relevant steps of an exemplary method for processing a request to a web page.

Referring now to FIG. 4, which illustrates a flowchart with relevant processes of an exemplary process 400. The process 400 can be used for handling a mobile device's 110 (FIG. 1) HTTP request. The process 400 can be implemented by request handler module 220*a-c* (RHM) (FIG. 1), for example. One exemplary embodiment of process 400 can be initiated by the MM 280 (FIG. 2) upon receiving a new request via the HTTP proxy 210, for example. In an alternate embodiment, several instances of process 400 can run in parallel, one per each request. In an alternate exemplary embodiment (not shown in the drawings), the process 400 can run in a loop each cycle in the loop can be dedicated to a received request.

After initiation step 402, the request's URL can be parsed 404 and a new entry in the SST 260 (FIG. 2) can be allocated. In another exemplary embodiment, the HTTP Proxy 210 (FIG. 2) can allocate a new entry in SST 260 before passing the HTTP request to the RHM 220 (FIG. 2). Next a decision is made 410 whether the URL of the request is marked. The marking was executed while parsing the ML file that carried the URL to the internal ML file. If 410 the URL is marked, then the process 400 can restore 412 the destination address, update 412 the SST 260 (FIG. 2) that the requested ML file is a marked one, and send 412 the request with the restored URL toward the web site 150 (FIG. 1). Then process 400 ends.

If 410 the URL is not marked, then a decision is made whether 414 the mobile device 110 (FIG. 1) is a smart device. The process 400 can parse the user-agent field in the HTTP request and accordingly can fetch from the UADB 250 (FIG. 2) information regarding the capabilities of the mobile device. If 414 the mobile device is a smart device, then the process 400 proceeds to step 422. At step 422, the relevant entry in the SST 260 is updated to point that the mobile device 110 is a smart device. Next, the process 400 can send 422 the request toward the web site 150 (FIG. 1). Then, the process 400 ends. Returning now to step 414, if the mobile device 110 is not smart then the process 400 proceeds to step 420.

At step 420 a decision is made, whether the web site 150 (FIG. 1) is a mobile aware web site or not. A web site can be detected as a mobile aware web site by the extension of the HTTP request (mobi for example), or by the beginning (WAP for example), for example. If 420 yes, then the process 400 can update 422 the relevant entry in the SST 260 indicating that the 150 (FIG. 1) is a mobile aware web site. The process 400 can send 422 the request toward the web site 150 (FIG. 1), and the process 400 ends. If 420 the web site 150 (FIG. 1) is not mobile aware, process 400 can update 424 the relevant entry in the SST 260 that the 150 (FIG. 1) is not a mobile aware web site and the mobile device 110 is not smart. The HTTP request is forward toward the content adaptation server CAS 137 (FIG. 1) if exists, and method 400 ends.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the words "unit", "element" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware. Software of a logical module can be embodied on a computer readable medium such as a read/write hard disc, CDROM, Flash memory, ROM, etc. In order to execute a certain task a software program can be loaded to an appropriate processor as needed.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A data insertion server (DIS) apparatus that adds data to a requested web page in an intermediate node between a mobile device and a web site, the DIS comprising:
   an HTTP proxy;
   a request-handler processor (RHP);
   a markup-language-file-handler processor (MLFHP); and a surfing session table accessible by the HTTP proxy and RHP for the storage surfing session data;

wherein said HTTP proxy is configured to:
  intercepts the data traffic between the mobile device and the web site;
  routes a request for a markup language file that describes the requested web page to said RHP, wherein the request is obtained from the mobile device; and
  routes a response to the request toward said MLFHP, wherein the response is obtained from the web site;

wherein said RHP is configured to:
  identify the mobile device capabilities and the web site features; and
  updates the surfing session table accordingly;

wherein said MLFHP, based on the information of the session stored in the surfing session table entry, is configured to:
  processes the received markup language file to:
    identify a location for adding the data in the response;
    identify one or more links to internal markup language files;
    mark the links to internal markup language files; and
    adds the data to the received markup language file; and wherein said surfing session table has a plurality of entries, each of the entries is a associated with a session and contains information on the capabilities of the mobile device, features of web site and data on the requested web page.

2. The DIS apparatus of claim 1, wherein the added data is a footer.

3. The DIS apparatus of claim 1, further comprising a user agent database that stores information on the mobile device and wherein said RHP identifies the mobile device capabilities according to information from a user-agent field in the request.

4. The DIS apparatus of claim 1, wherein said RHP further identifies a request for an internal markup language file.

5. The DIS apparatus of claim 1, wherein adding data is modifying a footer placeholder which was added by a content adaptation server.

6. The DIS apparatus of claim 1, wherein said MLFHP adds a JavaScript in association with the added data, and wherein the JavaScript is capable of preventing repetition of the added data.

7. The DIS apparatus of claim 1, wherein said MLFHP adds the data in a frameset that wraps other framesets in the requested web page.

8. The DIS apparatus of claim 1, wherein said MLFHP further estimates an available space by comparing the size of the additional data with size of the markup language file to the available memory in the mobile device for determining whether to add the data.

9. The DIS apparatus of claim 1, wherein said markup language file is an HTML file.

10. The DIS apparatus of claim 1, wherein said markup language file is a WML file.

11. The DIS apparatus of claim 1, wherein the added data includes information that relevant to the user of the mobile device.

12. The DIS apparatus of claim 11, wherein the relevant information includes the user's bookmark.

13. A method for adding data to a requested web page in an intermediate node between a mobile device and a web site, the method comprising:
  intercepting the data traffic between the mobile device and the web site;
  allocating in a surfing session table an entry per each session;
  identifying capabilities of the mobile device, and updating the relevant entry in the surfing session table;
  processing a received markup language file, which describes the requested web page, for identifying one or more links to internal markup language files and marking the links; and
  identifying a location at the requested web page that fits the added data.

14. The method of claim 13, further comprising: identifying features of the web site, and updating the relevant entry in the surfing session table.

15. The method of claim 13, wherein the added data is a footer.

16. The method of claim 13, wherein the markup language file is an HTML file.

17. The method of claim 13, wherein the added data includes information that relevant to the user of the mobile device.

18. The method of claim 17, wherein the relevant information includes the user's bookmarks.

19. A data insertion server (DIS) that adds data to a requested web page in an intermediate node between a mobile device and a web site, the DIS comprising:
  an HTTP proxy;
  a request-handler processor (RHP);
  a markup-language-file-handler processor (MLFHP); and
  a surfing session table;
  wherein said HTTP proxy intercepts the data traffic between the mobile device and the web site; routes a request for a markup language file that describes the requested web page to said RHP, wherein the request is obtained from the mobile device, and routes a response to the request toward said MLFHP, wherein the response is obtained from the web site;
  wherein said RHP identifies the mobile device capabilities and the web site features and updates the surfing session table accordingly;
  wherein said MLFHP, based on the information of the session stored in the surfing session table entry, processes the received markup language file for identifying a location for adding the data in the response, adds the data and a JavaScript in association with the added data, wherein the JavaScript is capable of preventing repetition of the added data; and
  wherein said surfing session table has a plurality of entries, each of the entries is a associated with a session and contains information on the capabilities of the mobile device, features of web site and data on the requested web page.

20. A method for adding data to a requested web page in an intermediate node between a mobile device and a web site, the method comprising:
  intercepting the data traffic between the mobile device and the web site;
  allocating in a surfing session table an entry per each session;
  identifying capabilities of the mobile device and updating the relevant entry in the surfing session table;
  processing a received markup language file, which describes the requested web page for identifying a location at the requested web page to add the added data and adding information related to a JavaScript that is capable of preventing repetition of the added data.

* * * * *